United States Patent [19]

Okumura

[11] Patent Number: 4,779,121
[45] Date of Patent: Oct. 18, 1988

[54] DOCUMENT SCANNING DEVICE

[75] Inventor: Masafumi Okumura, Yamatokoriyama, Japan

[73] Assignee: Sharp Kabushiki Kaisha, Osaka, Japan

[21] Appl. No.: 924,281

[22] Filed: Oct. 29, 1986

[30] Foreign Application Priority Data

Oct. 31, 1985 [JP] Japan .................................. 60-245879

[51] Int. Cl.⁴ ............................................ G03B 27/74
[52] U.S. Cl. .................................... 355/68; 355/14 E; 355/69; 355/55
[58] Field of Search ...................... 355/14 E, 68, 69, 8, 355/14 R, 55

[56] References Cited

U.S. PATENT DOCUMENTS 4,636,063 1/1987 Takai et al. .................... 355/14 E X

*Primary Examiner*—Michael L. Gellner
*Assistant Examiner*—D. Rutledge
*Attorney, Agent, or Firm*—Flehr, Hohbach, Test, Albritton & Herbert

[57] ABSTRACT

A document scanning device such as a copier has defined within itself a point at which the brightness of an original document is detected and a separate point at which the document is scanned. The level of light exposure given to the document is controlled according to the detected brightness. The distance between the aforementioned two points is set with the delay time of an exposure control circuit taken into account. The delay time is set according to the fastest scanning speed of the device and is increased by means of a delay circuit if the scanning speed is deceased.

8 Claims, 2 Drawing Sheets

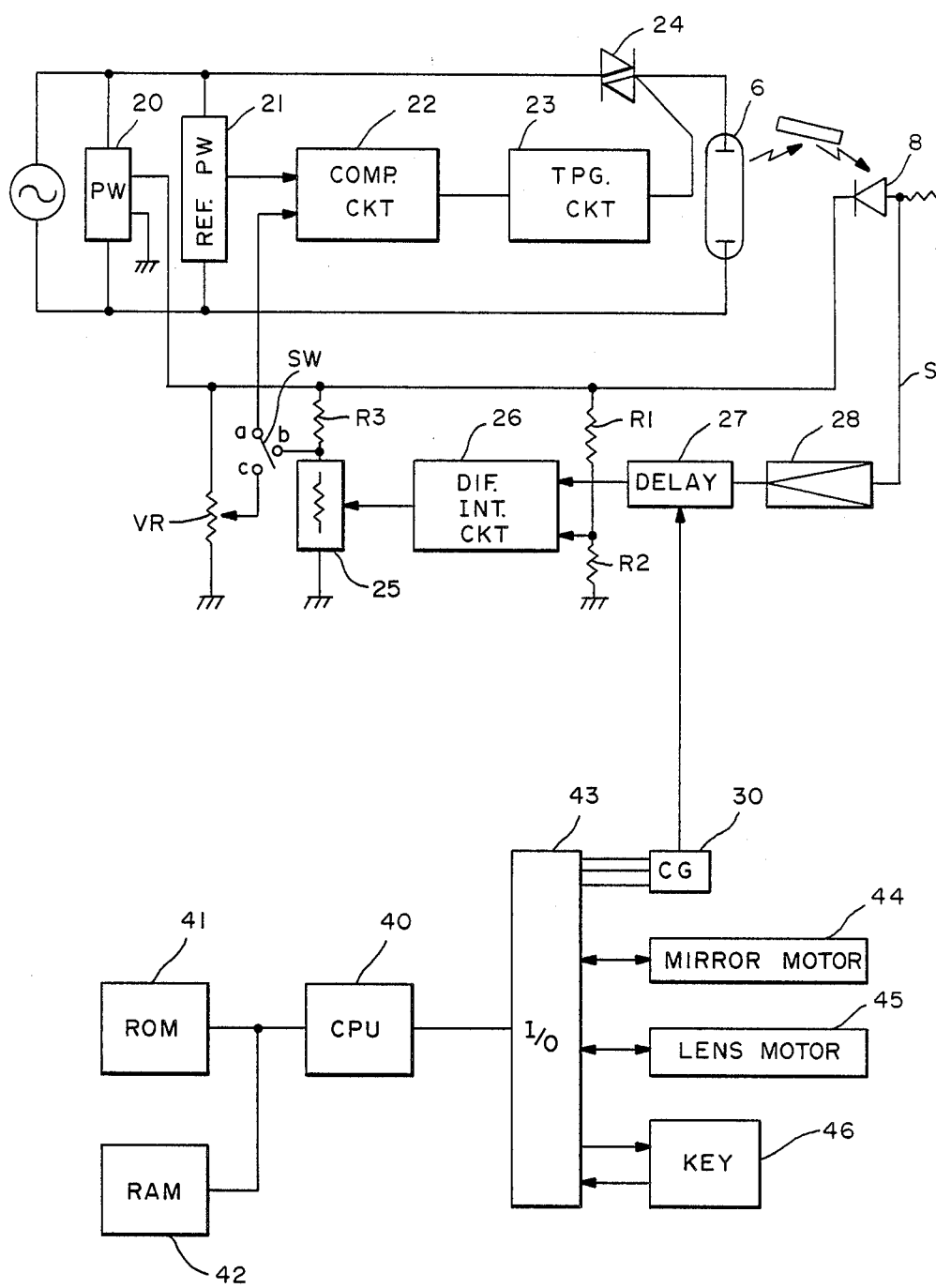
FIG.—1

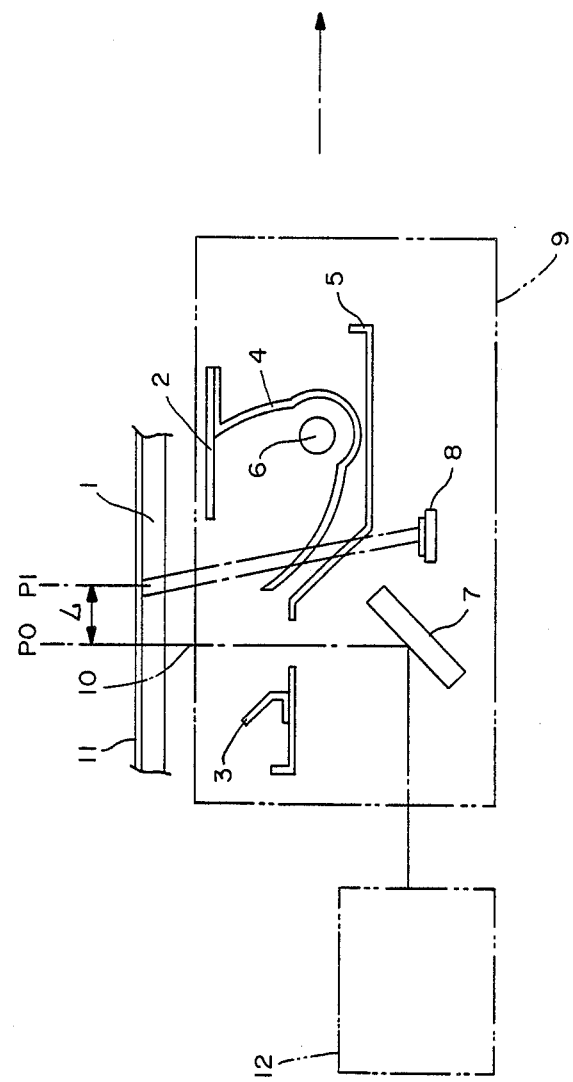
FIG.—2

DOCUMENT SCANNING DEVICE

BACKGROUND OF THE INVENTION

This invention relates to a device which detects the brightness of an original document to be scanned and controls its exposure to light according to the detected level of brightness of the document and more particularly to such a device for which the timing of controlling the exposure is accurately set with respect to the position at which brightness of the document is detected.

There have been original document scanning devices such as copiers and telecopiers having the automatic exposure controlling capability, or the ability to automatically adjust the exposure to an appropriate level according to the brightness of the original document to be scanned. Such devices typically control the level of exposure by using a beam of light from a source to irradiate the document to be scanned, receiving the beam reflected from the document surface by a light receiving element and controlling the brightness of the source such that its signal will have a predetermined value. Although the exposure of a photosensitive body or an image sensor can thus be adjusted automatically to an optimum level, there arises a problem of delay in the control circuit which controls the exposure on the basis of a signal from the light receiving element.

One of the methods of overcoming this problem in the case of a high-speed copier, for example, has been to define a brightness detecting point and to control the exposure appropriately on the basis of the document brightness measured at the brightness detecting point. In the case of a copier with variable magnification, however, the scanning speed changes when the magnification is changed. As a result, the timing of response by the exposue controlling device may become incorrect, depending on the magnification, although an interval of a fixed distance is set as explained above.

SUMMARY OF THE INVENTION

It is an object of the present invention to provide a document scanning device with which the timing for the control of exposure can be accurately set with respect to the position where the brightness of the document is detected even if the speed of scanning is varied.

The above and other objects of the present invention are achieved by providing a device in which a brightness detecting point is set in front of a document scanning point such that the exposure is controlled on the basis of the brightness of the document at this detecting point. Not only is the distance between the aforementioned document scanning point and brightness detecting point set to correspond to the delay in the exposure control circuit when the scanning speed is at the greatest but the device is also provided with a delay means for increasing the delaying further as the document scanning speed is reduced.

Let L denote the distance between the document scanning position and the point at which the brightness of the original document is detected. If $V_m$ represents the speed of scan when the magnification is m and hence $V_1$ represents the speed of scan without magnification (or m=1), it is well known that $V_m = V_1/m$. Thus, $V_m$ increases as m decreases and the maximum value of $V_m$ ($=V_{max}$) is related to the minimum magnification $m_{min}$ by $V_{max} = V_1/m_{min}$. Since the aforementioned length L is determined according to the delay ($=t_0$) in the exposure control circuit when the scanning speed is at the greatest, as explained above, L is given by $V_{max}t_0$. Assume now that the magnification has been changed from the maximum value $m_{max}$ to a certain smaller value m such that the scanning speed is correspondingly changed to $V_m$. Since the distance L is fixed, the delay must also change from $t_0$ to a different value $t_m$ given by $L = V_m t_m$. In other words, the delay must be changed by $t_m - t_0 = (L/V_m)(L/V_{max}) = L(m - m_{min})/V_1$.

In short, the distance between the point where the brightness is detected and the position where the original document is scanned is set according to the delay time of the exposure controlling circuit when the scanning speed is at the slowest level and the aforementioned delay time is further increased if the scanning speed is reduced according to an increase in the magnification. In this manner, the timing for the control of exposure can be precisely set with respect to the position at which the brightness of the original document to be scanned is detected.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a circuit diagram of the control section of a document scanning device embodying the present invention, and FIG. 2 is a schematic drawing for showing the structure of the scanning section of a document scanning device incorporating the present invention.

DETAILED DESCRIPTION OF THE INVENTION

FIG. 2 shows the scanning section of a document scanning device embodying the present invention, including a document table 1 and a mirror carriage 9. An original document 11 placed on top of the document table 1 is scanned by the motion of the mirror carriage 9 in the direction of the arrow. The mirror carriage 9 is provided with a light source 6, a reflector 4 and a subreflector 3 for causing the beams from the source 6 to effectively illuminate the document 11 at the document scanning point $P_0$, and an adjusting plate 2 for adjusting the range of illumination, etc., these components being supported by a supporting plate 5. Numeral 7 indicates a mirror for directing the beam reflected from the document 11 to an image receiving section 12 which may include, for example, a photosensitive drum, line image sensors and the like. Numeral 8 indicates a light receiving element for receiving beams reflected from a neighborhood of a point $P_1$ which lies in front of the document scanning point $P_0$ by a distance L. The distance L is so chosen as to correspond to the delay time of the exposure control circuit when the mirror carriage 9 effects the scanning at the highest speed.

FIG. 1 is a circuit diagram of the aforementioned exposure control circuit adapted to control the illuminance by varying the brightness of the light source 6 according to the detection signal from the light receiving element 8 and the document scanning speed of the mirror carriage 9. The light source 6 is connected to a commercial power source through a triac 24. The triac 24 controls the brightness of the light source 6 by becoming switched on and off at a relatively high frequency on the basis of an output signal from a trigger pulse generation circuit (TPG CKT) 23. A reference power source (REF. PW) 21 is adapted to output a standard reference voltage. A comparison circuit (COMP CKT) 22 compares this reference voltage with a voltage selected by a switch SW and a voltage signal indicative of their difference is transmitted to the trigger pulse generation circuit 23. The trigger pulse generation circuit 23 outputs trigger pulses in synchronism with the frequency of the commercial power source. The phase of its trigger pulses is controlled according to the output signal from the comparison circuit 22.

The output signal from the light receiving element 8 is received by an amplifier circuit 28. The amplified signal is received by one of the terminals of a difference integration circuit (DIF. INT. CKT) 26 with a delay caused by a delay circuit (DELAY) 27. The difference integration circuit 26 is adapted to integrate the voltage difference between the reference voltage determined by a first resistance R1 and a second resistance R2 and the output signal from the delay circuit 27. Numeral 25 indicates an impedance circuit which varies the impedance between its two terminals according to the output signal from the difference integration circuit 26. The switch SW is for changing the mode of operation. If the switch connects terminals a and b, the system is in the automatic adjustment mode and a voltage determined by a third resistance R3 and the impedance circuit 25 is introduced to the aforementioned comparison circuit.

If the voltage difference applied to the difference integration circuit 26 is zero, the output voltage from the difference integration circuit 26 is maintained at a constant level and the impedance of the impedance circuit 25 is maintained at a constant value corresponding to this voltage.

If the original document has a high density and the output voltage s from the light receiving element is low, the output voltage from the difference integration circuit 26 becomes low after a delay time caused by the delay circuit 27 and the impedance of the impedance circuit 25 becmes high. This raises the voltage applied to the comparison circuit 22 and increases the brightness of the light source 6. When the output voltage of the light receiving element 8 reaches a predetermined level, this return circuit reaches an equilibrium condition. In the case of a bright original document, on the other hand, the output voltage s of the light receiving element 8 becomes high and the brightness of the light source 6 becomes low. An equilibrium condition is reached likewise when the output voltage of the light receiving element 8 reaches a predetermined level. In summary, exposure of the light source 6 is so controlled as to reach a desired level after a delay time caused by the delay circuit 27 in accordance with the amount of light received by the light receiving element 8. This delay circuit 27 represents what may later be referred to as the delay means.

With reference still to FIG. 1, numeral 20 represents a power circuit (PW) for all of the aforementioned sections and components. A variable resister VR is provided for manually controlling the light energy. The manual mode of control operation is selected by connecting the terminals a and c of the switch SW. The delay time of the aforementioned delay circuit 27 is controlled by a central processing unit (CPU) 40 which also serves to control the entire operation of the document scanning device. ROM 41 is a memory means which stores the control program for the central processing unit 40 and RAM 42 is a memory means which is used as a working area when this program is carried out. I/O 43 is an input-output port for the control of an input-output device in accordance with the control of the central processing unit 40. Numeral 30 indicates a clock generator (CG) which outputs several predetermined kinds of oscillation frequency signals on the basis of a signal received from the input-output port 43. The output signals from the clock generator 30 are received by the delay circuit 27. The delay circuit 27 comprises a bucket brigade device (BBD) and the delay time is determined from the number of elements in the bucket brigade device and the frequency of a clock signal. In other words, ,the delay time is set by varying the clock frequency of the clock generator 30.

A mirror motor control circuit 44 is provided for controlling the mirror motor for the document scanning by the aforementioned mirror carriage 9. The speed of document scanning is controlled by the central processing unit 40. A lens motor control circuit 45 is for controlling the lens motor which changes the focal distance and the position of a zoom lens disposed inside the image receiving section 12. The lens motor control circuit 45 is also under the control of the central processing unit 40.

As an input device, there is provided a key input means 46 for setting image receiving conditions such as magnification. The central processing unit 40 responds to the selected magnification by sending corresponding control signals to the lens motor control circuit 45, the mirror motor control circuit 44 and the clock generator 30. When the smallest magnification has been chosen and the document scanning speed is the fastest, for example, the clock generator 30 transmits a clock signal with the highest frequency. Receiving this clock signal with the highest frequency, the delay circuit 27 transmits the output signal from the amplifier circuit 28 to the difference integration circuit 26 with hardly any delay. If the magnification is set to 1 or grater than 1 (enlargement), on the other hand, a clock signal with a low frequency is transmitted from the clock generator 30 and the delay circuit 27 imposes a delay corresponding to the frequency of this clock signal on the output signal from the amplifier circuit 28 before transmitting it to the difference integration circuit 26.

The foregoing description of a preferred embodiment of the invention has been presented for purposes of illustration and description. It is not intended to be exhaustive or to limit the invention to the precise form disclosed, and many modifications and variations are possible in light of the above teaching. For example, the present invention was illustrated above by way of an example according to which a delay would be effected by the delay circuit even if the document is scanned at the fastest speed, but this is not intended to limit the scope of the present invention. The control may be so designed, for example, that there will be no delay in the case of a reduction and that a delay is effected only in the case of an enlargement. For such a simple two-step delay control, a switch may be provided to select whether the output signal from the amplifier circuit 28 is directed to the difference integration circuit 26 directly or through a delay circuit having a fixed delay time.

Secondly, although FIG. 2 illustrates an example with a fixed document table and a mobile mirror carriage for carrying out a document scan, the scan may be effected by causing the document table to move with respect to a stationary mirror carriage with the positional relationship kept in the same way between the point where the document is exposed and the point at which its brightness is detected.

Moreover, the level of exposure need not be controlled by varying the brightness of the light source as in the example described above. The level of exposure can be controlled equally effectively, even if the brightness of the light source remains constant or no lamp of a special kind is used for illumination, by varyingthe sensitivity of the image receiving means or its bias value. Such modifications and variations which may be apparent to a person skilled in the art are intended to be included within the scope of this invention.

What is claimed is:

1. In a document scanning device having a document brightness detecting point defined at a distance away from a document scanning point, said device being programmed to control light exposure on on original document according to the brightness of said document measured at said document brightness detecting point, said distance being set according to a delay time of an exposure control circuit, the improvement wherien said distance is set according to a delay time of said exposure control circuit corresponding to the fastest speed of scan by said device and wherein said device comprises a delay means for increasing said delay time when the speed of scan by said device is decreased.

2. The document scanning device of claim 1 further comprising a central processing unit which serves to control the scanning speed of said device.

3. The document scanning device of claim 2 wherein said central processing unit controls the scanning speed of said device according to selected magnification.

4. The document scanning device of claim 1 wherein said delay means comprises a bucket brigade device, 5. The document scaning device of claim 1 further comprising a clock generator adapted to transmit a plurality of different oscillation frequency signals to said delay means, said delay means determining said delay time according to received one of said oscillation frequency signals.

6. the document scanning device of claim 5 further comprising a central processing unit which transmits a control signal to said clock generator.

7. the document scanning device of claim 1 wherein said delay means is programmed either to effect a delay by a predetermined delay time or not to effect any delay.

8. The document scanning device of claim 7 wherein said delay means effects said delay by said predetermined delay time if said document scanning device is operated in an enlargement mode but does not effect any delay if said document scanning device is operated in a reduction mode.

* * * * *